US011265932B2

(12) United States Patent
Dhanda et al.

(10) Patent No.: US 11,265,932 B2
(45) Date of Patent: Mar. 1, 2022

(54) NARROWBAND SELECTION FOR MEASUREMENT REPORTING IN RANDOM ACCESS

(71) Applicant: QUALCOMM Incorporated, San Diego, CA (US)

(72) Inventors: Mungal Singh Dhanda, Slough (GB); Alberto Rico Alvarino, San Diego, CA (US); Arash Mirbagheri, San Diego, CA (US); Le Liu, Fremont, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 16/742,253

(22) Filed: Jan. 14, 2020

(65) Prior Publication Data

US 2020/0245378 A1    Jul. 30, 2020

Related U.S. Application Data

(60) Provisional application No. 62/798,942, filed on Jan. 30, 2019.

(51) Int. Cl.
*H04W 76/10* (2018.01)
*H04W 74/08* (2009.01)
(Continued)

(52) U.S. Cl.
CPC ........... *H04W 76/10* (2018.02); *H04W 24/10* (2013.01); *H04W 72/1289* (2013.01);
(Continued)

(58) Field of Classification Search
CPC . H04W 76/10; H04W 24/10; H04W 72/1289; H04W 74/004; H04W 74/006; H04W 74/0833
(Continued)

(56) References Cited

U.S. PATENT DOCUMENTS

2015/0264718 A1*  9/2015  Yu .................... H04W 74/0833
                                                            370/329
2016/0227582 A1*  8/2016  Vajapeyam ......... H04W 52/281
(Continued)

OTHER PUBLICATIONS

Huawei, et al., "Feature Lead Summary of Support of Quality Report in Msg3 for Non-Anchor Access", 3GPP Draft, 3GPPTSG RAN WG1 Meeting#94bis, R1-1811699, 3rd Generation Partnership Project (3GPP), vol. RAN WG1, No. Chengdu, China, Oct. 8, 2018-Oct. 12, 2018, Oct. 10, 2018 (Oct. 10, 2018), XP051519088, 9 Pages, Retrieved from the Internet: URL: http://www.3gpp.org/ftp/tsg%5Fran/WG1%5FRL1/TSGR1%5F94b/Docs/R1%2D1811699%2Ezip, [retrieved on Oct. 10, 2018], the whole document.
International Search Report and Written Opinion—PCT/US2020/013720—ISAEPO—dated Apr. 15, 2020.
(Continued)

*Primary Examiner* — Christopher R Crompton
(74) *Attorney, Agent, or Firm* — Procopio, Cory, Hargreaves & Savitch LLP

(57) ABSTRACT

A method, a computer-readable medium, and an apparatus are provided for wireless communication at a User Equipment (UE). The UE receives a second random access message from the base station after transmitting a first random access message. The second random access message comprises a random access response (RAR) that indicates a narrowband to be used for receiving a fourth random access message. The apparatus determines whether to perform a measurement of the narrowband for the fourth random access message based on an amount of time between receiving the second random access message and transmitting a third random access message. The base station may determine whether the report comprises a measurement of the first narrowband or the second narrowband based on an amount of time between the second random access message and the third random access message or based on an indication in the third random access message.

30 Claims, 11 Drawing Sheets

(51) Int. Cl.
*H04W 72/12* (2009.01)
*H04W 74/00* (2009.01)
*H04W 24/10* (2009.01)

(52) U.S. Cl.
CPC ....... *H04W 74/004* (2013.01); *H04W 74/006* (2013.01); *H04W 74/0833* (2013.01)

(58) Field of Classification Search
USPC .......................................................... 370/329
See application file for complete search history.

(56) References Cited

U.S. PATENT DOCUMENTS

2018/0192354 A1 7/2018 Yi et al.
2019/0029051 A1* 1/2019 Lu ..................... H04W 74/0833

OTHER PUBLICATIONS

Qualcomm Incorporated: "On MTC MSG3 and Connected Quality Reporting", 3GPP Draft, 3GPP TSG-RAN WG4 Meeting #91, R4-1906961, 3rd Generation Partnership Project (3GPP), vol. RAN WG4, No. Reno, USA, May 13, 2019-May 17, 2019, May 3, 2019 (May 3, 2019), XP051716880, 4 Pages, Retrieved from the Internet: URL: http://www.3gpp.org/ftp/tsg%5Fran/WG4%5FRadio/TSGR4%5F91/Docs/R4%2D1906961%2Ezip, [retrieved on May 3, 2019].
Samsung: "Feature Summary of 6.2.1.5 Support of Quality Report in Msg3", 3GPP Draft, 3GPPTSG RAN WG1 Meeting #94bis, R1-1811691, 3rd Generation Partnership Project (3GPP), vol. RAN WG1, No. Chengdu, China, Oct. 8, 2018-Oct. 12, 2018, Oct. 10, 2018 (Oct. 10, 2018), XP051519081, 12 Pages, Retrieved from the Internet: URL: http://www.3gpp.org/ftp/tsg%5Fran/WG1%5FRL1/TSGR1%5F94b/Docs/R1 %2D1811691%2Ezip, [retrieved on Oct. 10, 2018], the whole document.

* cited by examiner

NARROWBAND SELECTION FOR MEASUREMENT REPORTING IN RANDOM ACCESS

CROSS REFERENCE TO RELATED APPLICATION(S)

This application claims the benefit of U.S. Provisional Application Ser. No. 62/798,942, entitled "Narrowband Selection for Measurement Reporting in Random Access" and filed on Jan. 30, 2019, which is expressly incorporated by reference herein in its entirety.

BACKGROUND

Technical Field

The present disclosure relates generally to communication systems, and more particularly, to a wireless communication including random access.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. Another example telecommunication standard is New Radio (NR), e.g., 5G NR. NR is part of a continuous mobile broadband evolution promulgated by Third Generation Partnership Project (3GPP) to meet new requirements associated with latency, reliability, security, scalability (e.g., with Internet of Things (IoT)), and other requirements. NR may include services associated with enhanced mobile broadband (eMBB), massive machine type communications (mMTC), and ultra reliable low latency communications (URLLC). As the demand for mobile broadband access continues to increase, there exists a need for further improvements in wireless communication technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein improve communication between a User Equipment (UE) and a base station through the UE sending measurement of a narrowband in a report comprised in random access messaging.

In an aspect of the disclosure, a method, a computer-readable medium, and an apparatus are provided for wireless communication at a UE. The apparatus transmits, to a base station, a first random access message comprising a preamble. Then, the apparatus receives a second random access message from the base station in response to the first random access message, wherein the second random access message comprises a random access response (RAR), and wherein the RAR indicates a narrowband to be used for receiving a fourth random access message from the base station following the RAR. The apparatus determines whether to perform a measurement of the narrowband indicated in the second random access message and transmits, to the base station, a third random access message. The apparatus determines whether to perform the measurement of the narrowband indicated in the second random access message based on an amount of time between receiving the second random access message and transmitting the third random access message.

In another aspect of the disclosure, a method, a computer-readable medium, and an apparatus are provided for wireless communication at a base station. The apparatus receives, from a UE, a first random access message comprising a preamble and transmits, to the UE, a second random access message using a first narrowband, wherein the second random access message comprises a RAR, and wherein the RAR indicates a second narrowband to be used by the UE for receiving a fourth random access message from the base station following the RAR. The apparatus receives, from the UE, a third random access message comprising a report of a first measurement of the first narrowband or a second measurement of the second narrowband. The apparatus determines whether the report received in the third random access message comprises the first measurement of the first narrowband or the second measurement of the second narrowband based on an amount of time between the second random access message and the third random access message. Then, the apparatus transmits the fourth random access message using the second narrowband.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
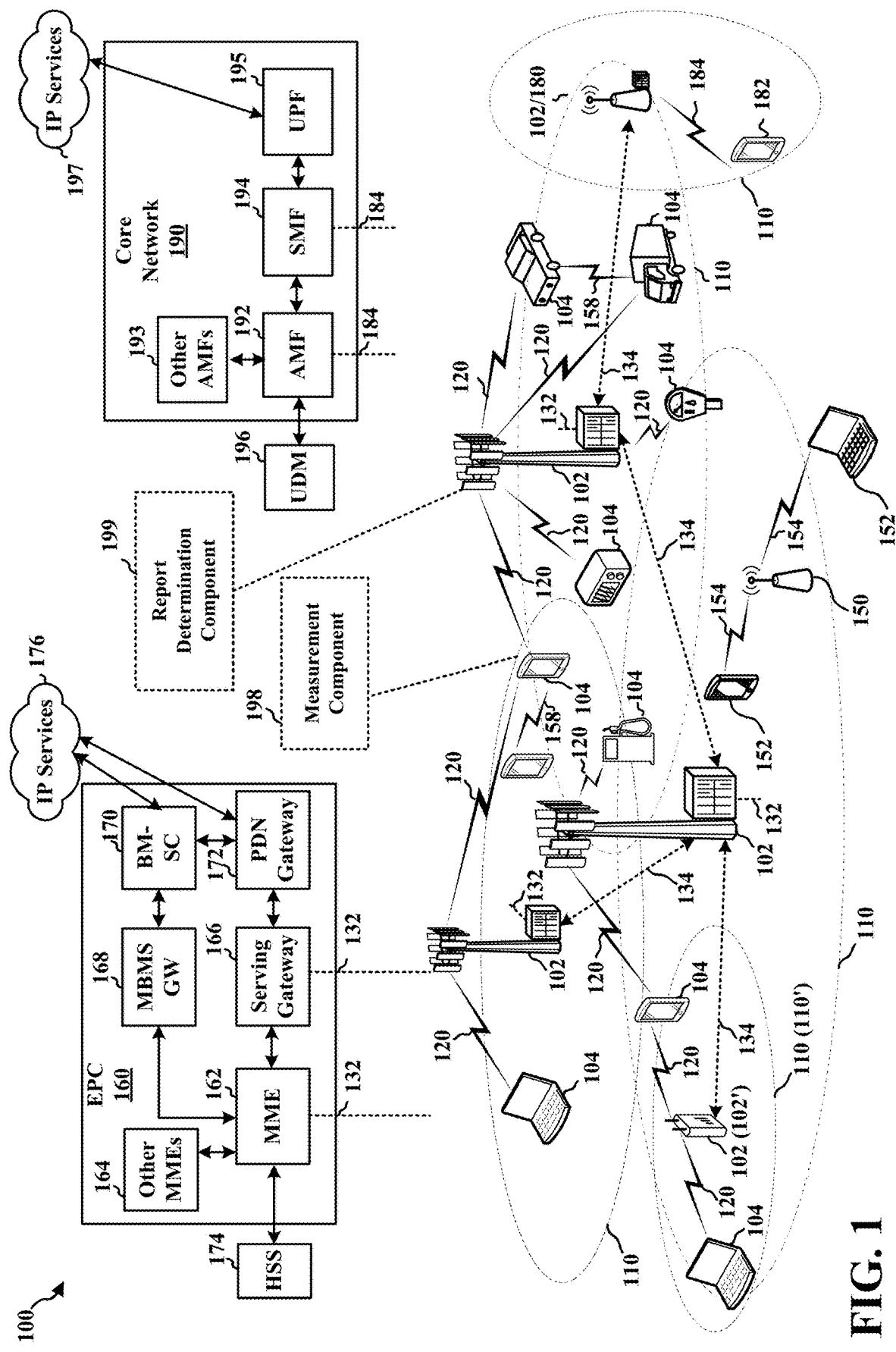
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects presented herein improve communication between a UE and a base station through the UE sending measurement of a narrowband in a report comprised in random access messaging. The UE may determine whether to perform a measurement of the narrowband indicated in the second random access message or a different narrowband, such as a narrowband for a fourth random access message. In some examples, the UE may determine whether to perform the measurement of the narrowband indicated in the second random access message based on an amount of time between receiving the second random access message and transmitting the third random access message.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180, e.g., gNB, operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise components for performing random access. The UE may include components configured to transmit a first random access message including a preamble; to receive a RAR using a first narrowband, the RAR indicating a second narrowband to be used by the UE for receiving a fourth random access message from the base station following the RAR; to transmit a third random access message comprising a report of the first narrowband or the second narrowband; and to receive a fourth random access message using the second narrowband. As illustrated in FIG. 1, the UE may include a measurement component 198 configured to determine whether to perform the measurement of the narrowband indicated in the second random access message based on an amount of time between receiving the second random access message and transmitting the third random access message.

In certain aspects, the base station 102/180 may comprise components for performing random access. The base station may include components configured to receive a first random access message including a preamble; to transmit a RAR using a first narrowband, the RAR indicating a second narrowband to be used by the UE for receiving a fourth random access message from the base station following the RAR; to receive a third random access message comprising a report of the first narrowband or the second narrowband; and to transmit a fourth random access message using the second narrowband As illustrated in FIG. 1, the base station may include a report determination component 199 configured to determine whether the report received in the third random access message comprises the first measurement of the first narrowband or the second measurement of the second narrowband based on an amount of time between the second random access message and the third random access message. Although the following description may be focused on LTE, the concepts described herein may be applicable to other similar areas, such as LTE-A, 5G NR, CDMA, GSM, and other wireless technologies.

Figure 2:
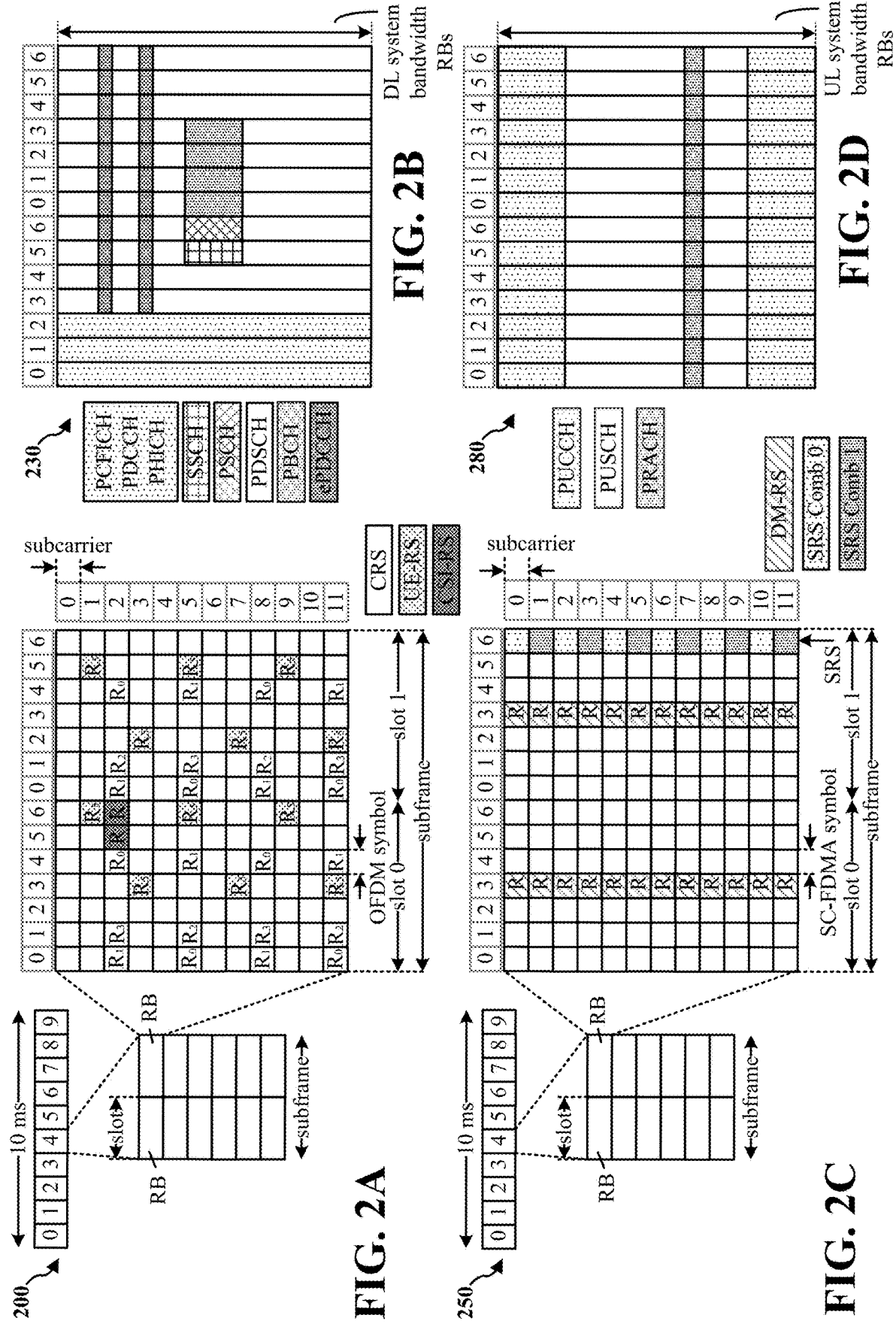
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure, e.g., in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
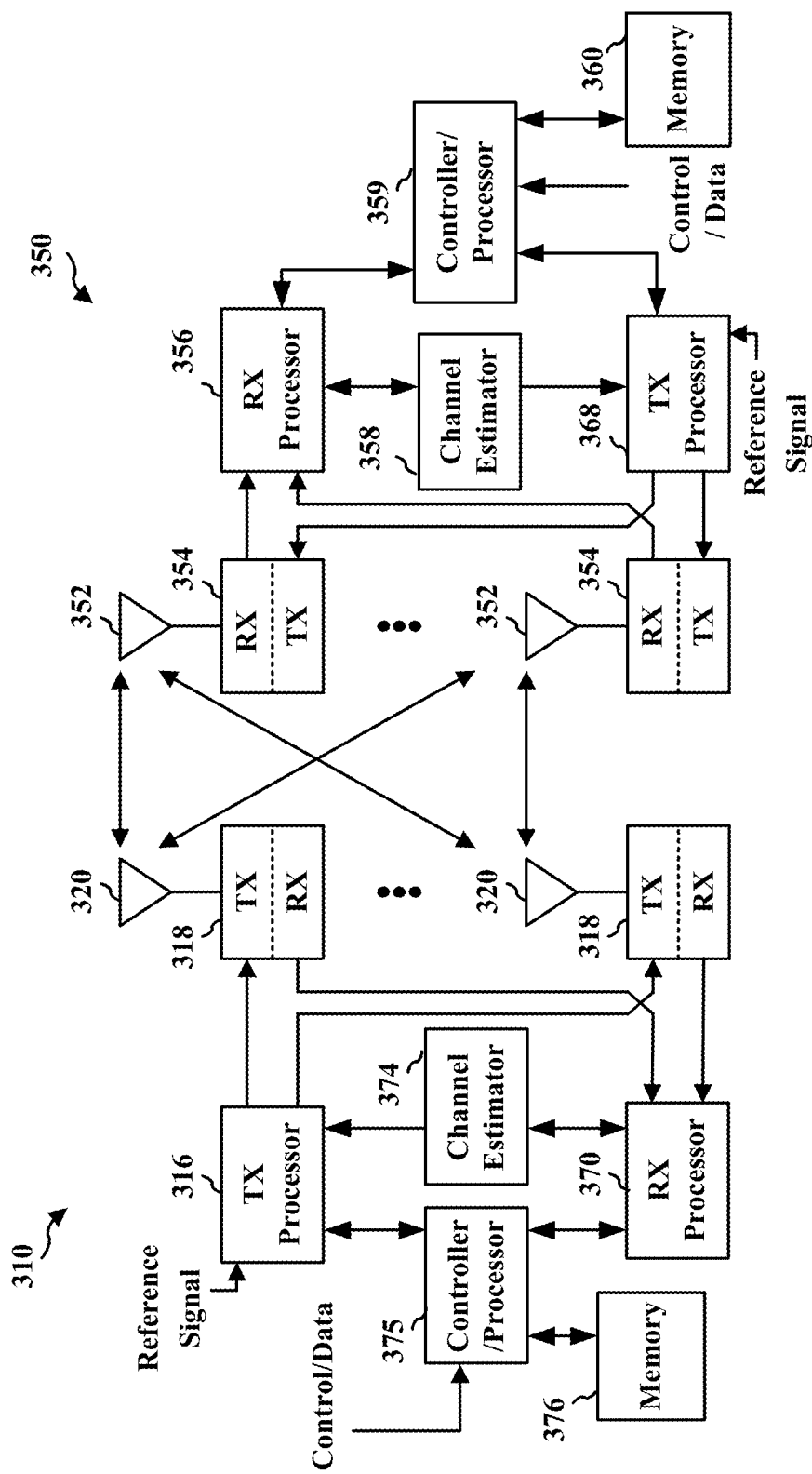
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A focus of the traditional LTE design relates to the improvement of spectral efficiency, ubiquitous coverage, and enhanced quality of service (QoS) support, etc. Thus, system down link (DL) and uplink (UL) link budgets may be designed for coverage of high end devices, such as state-of-the-art smartphones and tablets. However, it may be desirable to support low cost low rate devices as well. Such communication may involve a reduction in a maximum bandwidth, e.g., a narrowband bandwidth, use of a single receive radio frequency (RF) chain, a reduction in peak rate, a reduction in transmit power, the performance of half duplex operation, etc. One example of such narrowband wireless communication is Narrowband-Internet of Things (NB-IoT), which may be limited to a single RB of system bandwidth, e.g., 180 kHz. Another example of narrowband wireless communication is enhanced machine type communication (eMTC), which may be limited to as low as six RBs of system bandwidth. In other examples, eMTC communication may support 5 MHz (e.g., 25 RBs) or 20 MHz (e.g., 100 RBs).

Narrowband wireless communication involves unique challenges due to the limited frequency dimension of the narrow band. Additionally, low power operation may be helpful for such low complexity devices. Narrowband wireless communication involves unique challenges due to the limited frequency dimension of the narrow band, e.g., a single RB of system bandwidth for NB-IoT and as low as six RBs of system bandwidth for eMTC.

Figure 4:
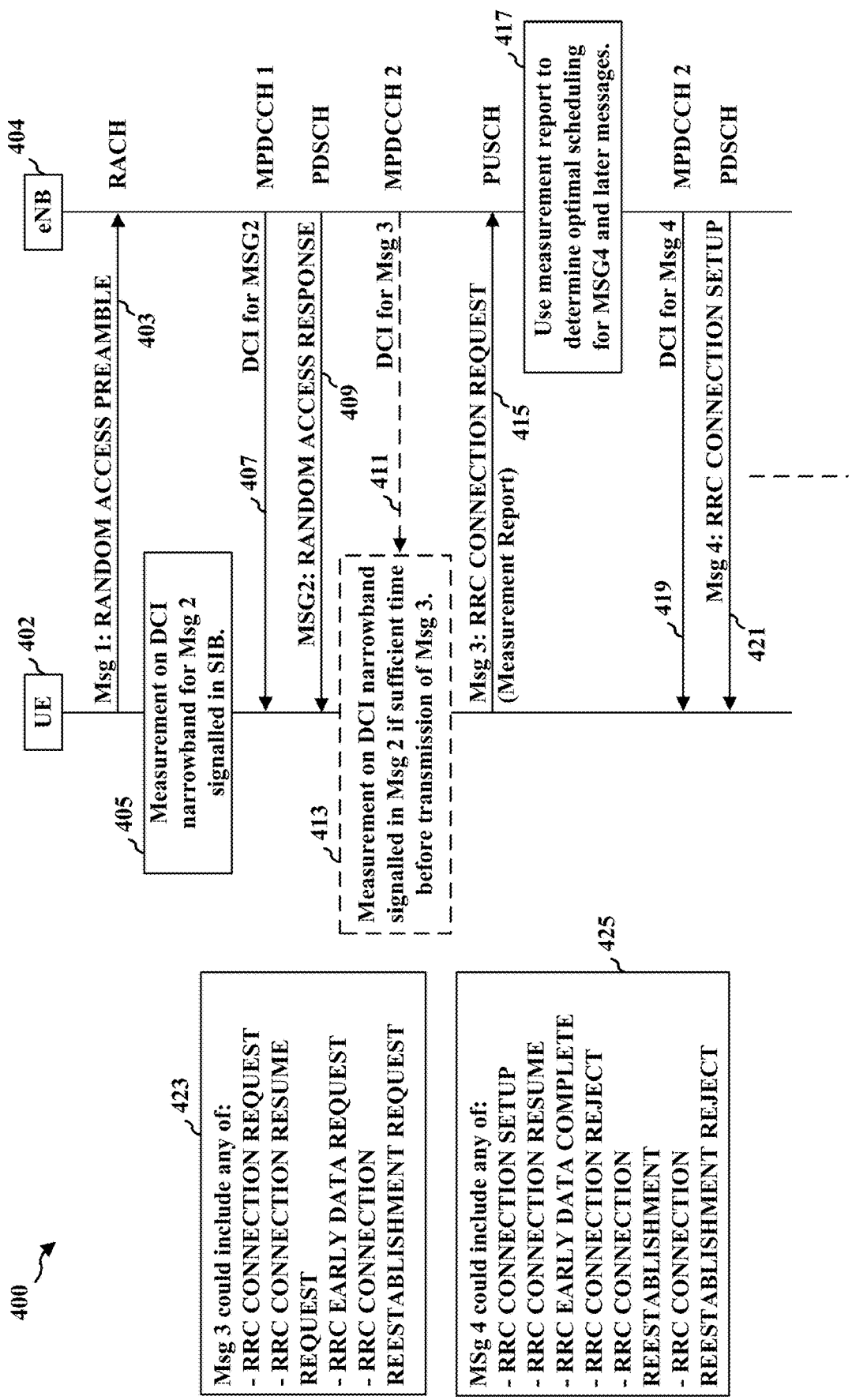
FIG. 4 is an example communication flow diagram between a base station and user equipment.

FIG. 4 illustrates an example communication flow 400 between a UE 402 and a base station 404 that includes aspects of a random access procedure. The UE 402 and base station 404 may communicate based on eMTC. At 403, the UE 402 may transmit a first random access message (e.g., Msg 1) of a random access procedure. The UE 402 may transmit Msg 1 to initiate a random access procedure with the base station 404. The preamble may be transmitted using a Random Access Channel (RACH) resources, as indicated in FIG. 4.

In response to receiving the Msg 1 403, the base station 404 may transmit a random access response (RAR) comprised in a second random access message (e.g., Msg 2) 409 to the UE 402. DCI 407 for the second random access message from the base station may be transmitted using a narrowband, e.g., a MTC PDCCH (MPDCCH). The narrowband (MPDCCH 1) for the UE 402 to use to monitor for DCI 407 for Msg 2 409 may be configured, e.g., by broadcast information. The narrowband may be configured in system information as an indication of an MPDCCH narrowband for the UE 402 to monitor (e.g., SIB2/mpdcch-NarrowbandsToMonitor). An MPDCCH may comprise a PDCCH designed for bandwidth reduced communication. Msg 2 may be transmitted on a PDSCH. Msg 2 409 may include various information, including an identifier for the UE, and uplink grant, information for use in transmitting Msg 3, etc. Msg 2 409 may also include an indication of narrowband resources that will be used to transmit Msg 4 to the UE 402.

The UE 402 may perform narrowband measurements during the random access procedure and may report the measurement(s) to the base station during the random access procedure, as illustrated in FIG. 4. Such early measurements enable the base station to determine optimal scheduling parameters for communicating with the UE 402 during the random access procedure. This enables the base station to communicate more effectively with the UE.

As illustrated at 405, the UE 402 may perform a measurement on the DCI 407 narrowband for Msg 2 (e.g., MPDCCH 1). The measurement at 405 of the narrowband to be monitored for Msg 2 may be referred to herein as "measurement 1." For example, the measurement may include a quality measurement (e.g., Reference Signal Received Quality (RSRQ)) of the narrowband, a signal power measurement of the narrowband, and/or a signal strength measurement (e.g., Reference Signal Received Power (RSRP)) of the narrowband. The measurement may include any other measurement quantity that may be helpful for a physical layer, such as a frequency offset, etc. The base station may signal the narrowband associated with Msg 2 to the UE 402 in system information, e.g., in a SIB. Thus, the UE 402 may use the information from the SIB to determine the narrowband associated with Msg 2 in order to perform the measurement at 405.

However, communication in an eMTC network may use one of many narrowbands. Radio resources to be used for Msg 3 may be configured by Msg2. The UE 402 might not monitor for DCI for an initial transmission of Msg 3. Thus, DCI 411 is illustrated using a dashed line. However, Msg 2 may configure a narrowband (e.g., MPDCCH 2) to be used for reception of DCI for retransmission of Msg 3 and/or for reception of DCI for Msg 4. Msg 2 may indicate the narrowband (MPDCCH 2) to monitor for DCI 419 for Msg 4. The DCI 419 for Msg 4 may indicate a narrowband to use for reception of Msg 4 421.

While reporting measurement of a narrowband as a part of the random access procedure may help the base station 404 to improve radio resource scheduling for the UE 402, there may be more than one narrowband that could be measured/reported by the UE 402. The UE 402 may perform a quality and/or signal power measurement on the narrowband (e.g., MPDCCH 1) used for reception of DCI 407 for Msg 2. Such a measurement of MPDCCH 1 allows the UE 402 sufficient time to perform the measurement (i.e. before transmission of Msg 1 or during monitoring DCI for Msg 2) and to generate a report to be included in Msg 3. However, the narrowband used for Msg 2 might be different from a narrowband used for Msg 4 (e.g., MPDCCH 2). Thus, measurements for MPDCCH 1 might not provide accurate information regarding narrowband (MPDCCH 2) used for Msg 4. However, there may be insufficient time to perform measurements between reception of Msg 2 and transmission of Msg 3.

Aspects presented herein enable the UE 402 to determine which narrowband(s) to measure and which narrowband(s) to report to the base station 404 as part of a random access procedure. The aspects improve communication between the UE 402 and the base station 404 through the UE 402 sending measurement of a narrowband in a report comprised in random access messaging. This early measurement performed as part of a random access procedure helps the base station to adapt communication to the needs of the UE 402 based on the conditions of the narrowband experienced at the UE 402. The method further enables the UE 402 to determine which narrowband to measure and report to the base station and enables the base station to identify the measurements reported during the random access procedure, e.g. in Msg 3.

Following reception of Msg 2 409, the UE 402 may transmit a third random access message (e.g., Msg 3) to the base station 404. As illustrated at 423, Msg 3 may comprise any of an RRC connection request, an RRC connection resume request, an RRC early data request, and RRC connection reestablishment request, etc. depending on the trigger that led the UE 402 to initiate the random access procedure. The UE 402 may report the measurement of the narrowband for Msg 2, performed at 405, by including a report of the measurement in Msg 3 415 that the UE transmits to the base station. Msg 3 415 may be transmitted to the base station 404 on PUSCH.

Among the other information provided in Msg 2, the base station 404 may indicate a narrowband that will be used to transmit Msg 4 421 following receipt of Msg 3. Thus, after receiving Msg 2, the UE 402 may be aware of the narrowband that will be used for Msg 4 421. In addition to or alternatively to the measurement 405, the UE 402 may perform a measurement on the DCI narrowband that will be used for Msg 3/Msg 4 (e.g., 411/419), as signaled to the UE 402 in Msg 2.

DCI 411 for Msg 3 may provide resources including a narrowband and RB for the UE 402 to use in transmitting/retransmitting Msg 3. The DCI 411 provides an amount of time, e.g., a gap, indicating the position in time that transmission of Msg 3 should start relative to a last subframe used for DCI. The UE 402 may use a size of the gap to determine whether to measure the narrowband for Msg 4 and/or whether to report measurements of the narrowband for Msg 4 in Msg 3. For example, if the gap between reception of Msg 2 and transmission of Msg 3 is not sufficient, then the UE 402 may report measurement(s) done on the narrowband used for DCI 407 for Msg 2 (e.g., measurement 1 for MPDCCH 1). If the gap between reception of Msg 2 and transmission of Msg 3 is sufficient, then the UE 402 can perform measurement(s) on the narrowband to be used for DCI for Msg3/Msg4 (e.g., measurement 2 for MPDCCH 2), e.g., at 413. The UE 402 may then report this measurement in Msg 3. The UE 402 may report both measurements from 405 and 413 or may report only the measurement from 413 when the gap is sufficient. The gap may be sufficiently long to enable the UE 402 to perform the measurement of the DCI for Msg 3/Msg 3 and to provide time for the UE to include the measurement in Msg 3. The UE 402 may determine whether the gap in time between Msg 2 and Msg 3 is sufficient by comparing the gap to a threshold amount of time. The threshold amount of time may be referred to herein as a required gap. The threshold amount of time, e.g. required gap, may be based on a predefined value that is known to the base station and the UE 402. In another example, the threshold amount of time may be indicated to the UE 402 by the network, e.g., in system information broadcast by the base station 404. Thus, a network or a base station may configure the threshold and provide the threshold to the UE. As one illustrative example, the base station 404 may configure a minimum gap to perform the measurements on DCI configured by Msg 2 for Msg 3/Msg 4 to be 20 subframes. Then, in order to receive measurements of DCI configured for Msg 3/Msg 4, the base station 404 may configure transmission of Msg 3 to occur at least 20 subframes following a last subframe used for the transmission of Msg 2.

The UE 402 may include an indication in Msg 3 to indicate whether the measurement(s) reported are for a narrowband associated with Msg 2 (e.g., MPDCCH 1) or for a narrowband associated with Msg 3/Msg 4 (e.g., MPDCCH 2), as described in connection with FIG. 8B. In another example, the base station 404 may identify the measurements in Msg 3 based on the amount of time between DCI for Msg 2 and Msg 3, e.g., as described in connection with FIG. 8A.

The base station 404 may use the measurement(s) reported in Msg 3 415 to determine scheduling parameters for Msg 4 421, at 417, and following messages for transmission to the UE 402. For example, the base station 404 may use the measurement to alter parameter(s) for downlink transmission for Msg 4, e.g., altering one or more of a number of repetitions, a transmission power, a modulation scheme, etc.

Based on the Msg 3 received from the UE 402, as well as other factors, Msg 4 421 may include any of an RRC connection set up message, an RRC connection resume message, an RRC early data complete message, and RRC connection reject message, an RRC connection reestablishment message, an RRC connection reestablishment reject message, etc. Msg 4 may be transmitted on PDSCH. DCI 419 for Msg 4 may provide resources including narrowband (e.g., MPDCCH 2) and an RB to be used by the base station to transmit Msg 4.

The base station 404 may configure narrowband hopping for Msg 4, e.g., in which the narrowband for Msg 4 hops in a hopping set across different narrowbands. The UE 402 may measure multiple narrowbands in the hopping set, e.g., all of the narrowbands in the configured hopping set. The UE 402 may determine what information to report regarding the narrowband measurements, e.g., whether to report a combination of the measurements and/or whether to select a particular measurement for a subset of narrowbands or even for a single narrowband. Likewise, it may be helpful for the base station 404 to know the manner in which the UE 402 performs the measurements of the narrowbands and what information is being provided regarding the narrowbands, For example, the UE 402 may determine a highest quality measurement and/or a highest signal power measurement from among the measurements of the different narrowbands, and may report the highest quality measurement or highest signal power measurement. The UE 402 may determine a lowest quality measurement and/or a lowest signal power measurement from among the different narrowbands to report to the base station 404. The UE 402 may combine the measurement information for multiple narrowbands and provide an average measurement across the different narrowbands to the base station, e.g., an average quality measurement and/or an average signal power measurement. The UE may perform wideband measurements covering at least the narrowbands in the hopping set. The UE 402 may provide a measurement (e.g., a quality measurement and/or a signal power measurement) of the first narrowband in the hopping set and/or the measurement of the last narrowband in the hopping set. The UE 402 may determine the measurement to report for the different narrowbands based on a predefined rule. In another example, the base station may signal to the UE 402 the information that should be measured and reported for the different narrowbands.

Figure 5:
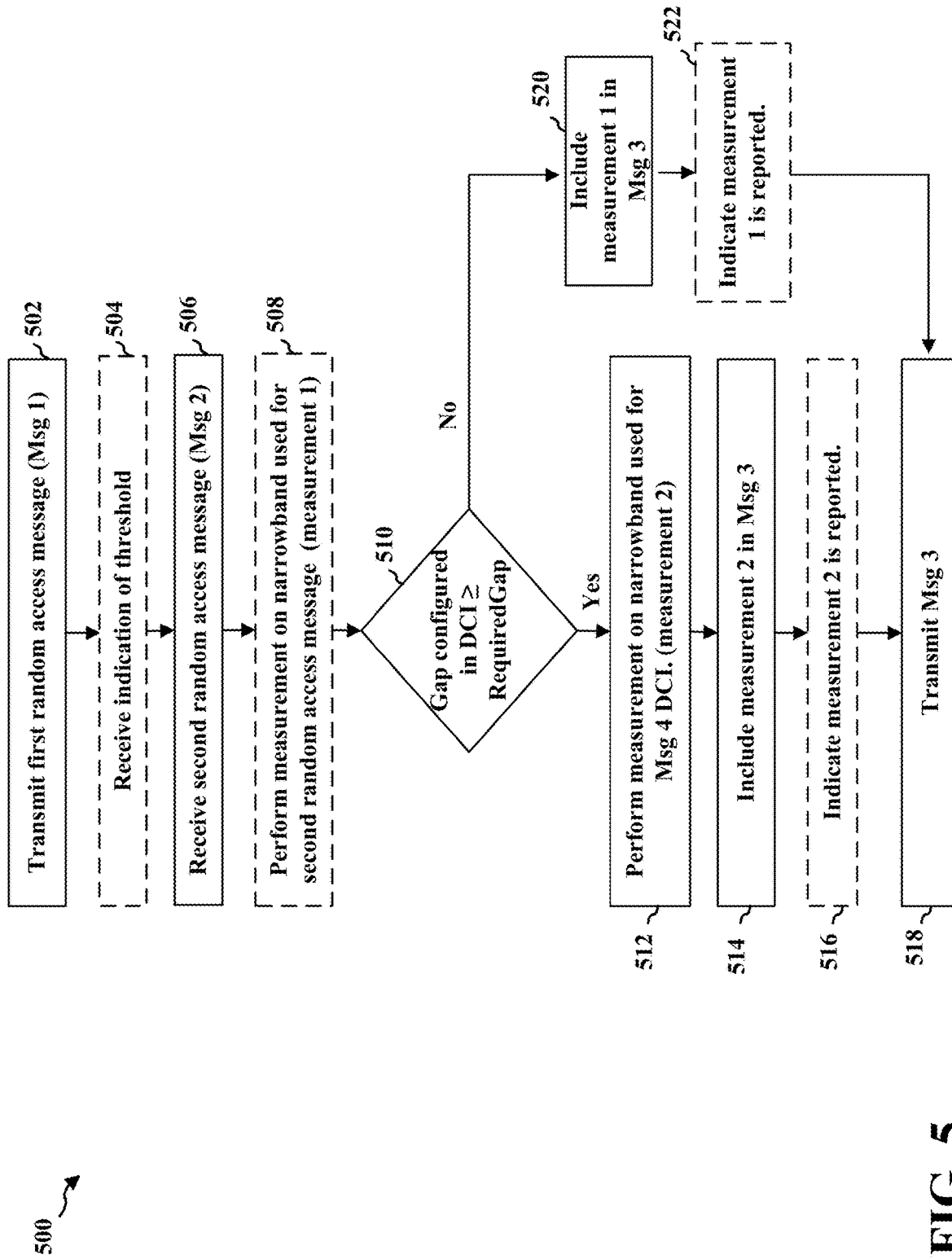
FIG. 5 is a flowchart of a method of wireless communication.

FIG. 5 is a flowchart 500 of a method of wireless communication. The method may be performed by a UE or a component of a UE (e.g., UE 104, 350, 402, 950; the apparatus 602, 602'; the processing system 714, which may include the memory 360 and which may be the entire UE 350 or a component of the UE 350, such as the TX processor 368, the RX processor 356, and/or the controller/processor 359). The UE may communicate with base station 650 using eMTC. Optional aspects are illustrated with a dashed line. The method may improve communication between a UE and a base station through the UE sending measurement of a narrowband in a report comprised in random access messaging. This early measurement performed as part of a random access procedure helps the base station to transmit communication to the UE based on the conditions of the narrowband experienced at the UE. The method further enables the UE to determine which narrowband to measure and report to the base station.

At 502, the UE transmits, to a base station, a first random access message comprising a preamble. The transmission may be performed, e.g., by the first random access message component 608 and/or the transmission component 606 of the apparatus 602 in FIG. 6. The first random access message may be referred to as Msg 1. FIG. 4 illustrates an example random access preamble at 403. As illustrated in FIG. 4, the preamble may be transmitted on a RACH.

In response to the transmission of Msg 1, at 506, the UE receives a second random access message (e.g., Msg 2) from the base station in response to the first random access message. The reception may be performed, e.g., by the reception component 604 and/or the second random access message component 610 of the apparatus 602 in FIG. 6. The second random access message comprises a RAR that indicates a narrowband to be used for receiving a fourth random access message from the base station following the RAR. As illustrated in the example of FIG. 4, the RAR may be transmitted on PDSCH. DCI for the Msg 2 may be transmitted on MPDCCH 1, e.g., using the first narrowband.

At 510, the UE determines whether to perform a measurement of the narrowband indicated in the second random access message based on an amount of time between receiving the second random access message and transmitting the third random access message. The determination may be performed, e.g., by the determination component 612 of the apparatus 602 in FIG. 6. As illustrated at 510, the UE may make the determination based on whether the time gap between Msg 2 and Msg3, as configured in DCI, is greater than a required time gap. For example, the UE may determine to perform the measurement of the narrowband indicated in the second random access message when the amount of time between receiving the second random access message and transmitting the third random access message meets a threshold. The UE may determine not to perform the measurement of the narrowband indicated in the second random access message when the amount of time between receiving the second random access message and transmitting the third random access message does not meet the threshold.

The required gap may correspond to a minimum gap to perform measurement between monitoring DCI on the second narrowband and the transmission of Msg 3. The required gap may be based on a predefined threshold that is known by the base station and the UE. In another example, the UE may receive, at 504, an indication of the threshold (e.g., required gap) from the base station. The threshold may be received, e.g., by the reception component 604 and/or the threshold component 614 of the apparatus 602 in FIG. 6.

At 518, the UE transmits, to the base station, a third random access message. The transmission may be performed, e.g., by the third random access message component 616 and/or the transmission component 606 of the apparatus 602 in FIG. 6. The second random access message may be received, on a first narrowband and the narrowband for the fourth random access message may comprise a second narrowband. As illustrated in FIG. 4, DCI for Msg 2 may use MPDCCH 1, and DCI for Msg 4 may use MPDCCH 2.

As illustrated at 508, the UE may perform the measurement of the first narrowband. The measurement may be performed, e.g., by the measurement component 618 of the apparatus 602 in FIG. 6. The UE may measure the first narrowband (e.g. MPDCCH 1) separate from the determination about whether to measure the second narrowband (e.g., MPDCCH 2). Thus, in certain aspects, the UE may always perform the measurement on the first narrowband, and may determine whether to further perform the measurement on the second narrowband. In such an example, an order of the measurements within the report may be used to indicate to the base station the narrowband to which the measurement(s) pertain. For example, measurement(s) for a first narrowband may be included first in the report, followed by measurement(s) for the second narrowband.

The UE may report, in the third random access message transmitted at 518, the measurement of the first narrowband or the second narrowband based on whether the UE determines to perform the measurement of the second narrowband that is indicated in the second random access message. The report may be provided, e.g., by the report component 620 of the apparatus 602 in FIG. 6. The report of the measurement may indicates whether the measurement is of the first narrowband or the second narrowband, e.g., as illustrated at 516, 522.

For example, the UE may perform the measurement for the second narrowband (e.g., MPDCCH 2), at 512, and report the measurement of the second narrowband in Msg3, at 514, if the amount of time between receiving the second random access message and transmitting the third random access message meets a threshold (e.g., if the time gap≥threshold time gap). The Msg 3 may include an indication that indicates that the measurement is of the second narrowband, as illustrated at 516.

The UE may report the measurement of the first narrowband, at 520, in the Msg 3 if the amount of time between receiving the second random access message and transmitting the third random access message does not meet the threshold (e.g., if the time gap<threshold time gap). The Msg 3 may include an indication that indicates that the measurement is of the second narrowband, as illustrated at 522.

The narrowband indicated in the second random access message may be configured for hopping in a hopping set across different narrowbands. Thus, performing the measurement on the narrowband used for Msg 4, at 512, may include performing the measurement of the different narrowbands. The measurement(s) included in Msg 3, at 514, may include at least one of a highest measurement (e.g., a quality measurement and/or a signal power measurement, etc.) of one of the different narrowbands, a lowest measurement (e.g., a quality measurement and/or a signal power measurement, etc.) of one of the different narrowbands, an average measurement (e.g., a quality measurement and/or a signal power measurement, etc.) across the different narrowbands, the measurement (e.g., a quality measurement and/or a signal power measurement, etc.) of an earliest narrowband in the hopping set, and/or the measurement of a last narrowband in the hopping set. The UE may determines the measurement to report for the different narrowbands based on a predefined rule. In another example, the UE may determine the measurement to report for the different narrowbands based on signaling from the base station.

Figure 6:
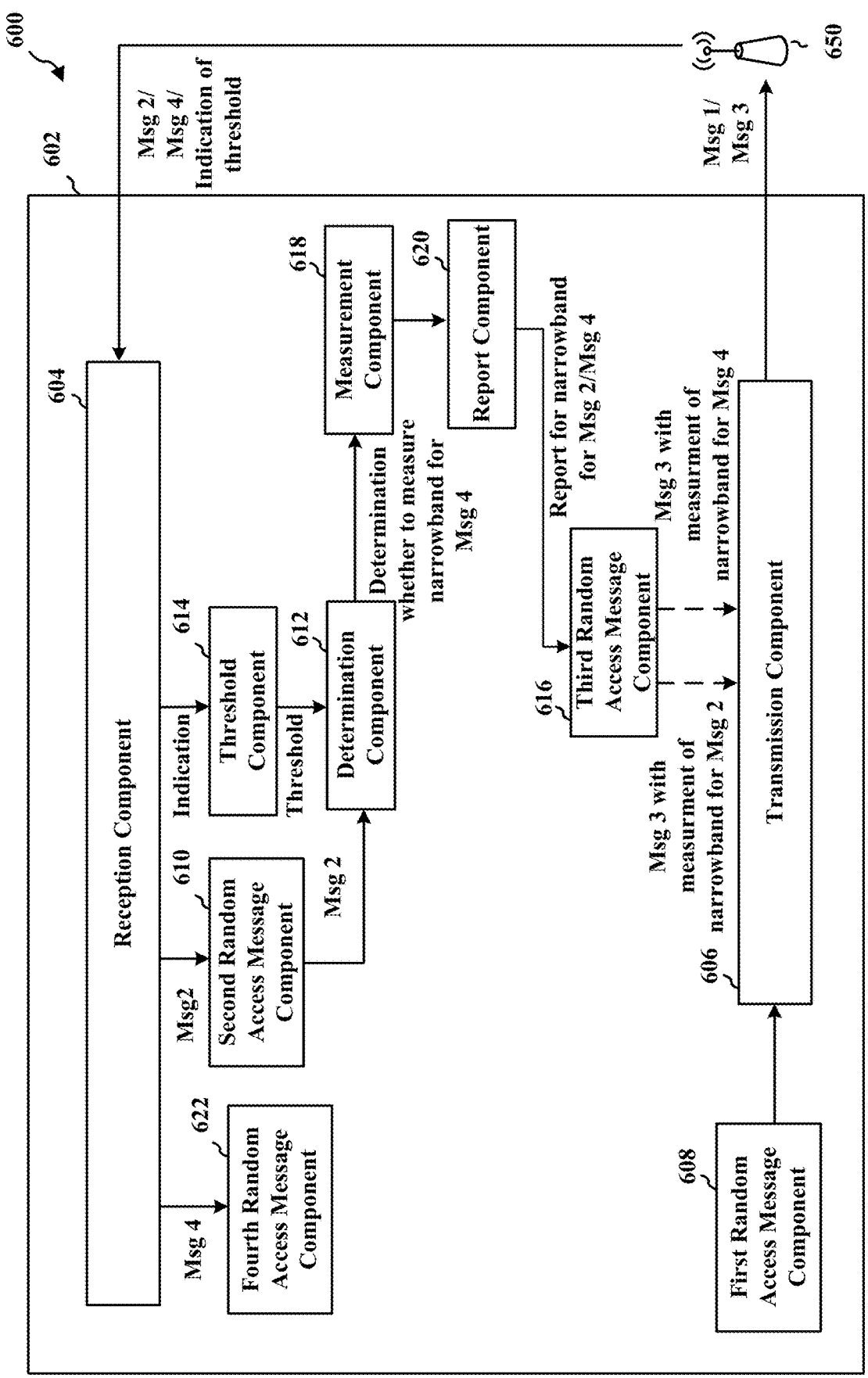
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be a UE or a component of a UE (e.g., UE 104, 350, 402, 950). The UE may communicate with base station 650 using eMTC. The apparatus includes a reception component 604 configured to receive downlink communication from base station 650 and a transmission component configured to transmit uplink communication to base station 650. The apparatus includes a first random access message component 608 configured to transmit, to base station 650, a first random access message comprising a preamble. The apparatus includes a second random access message component 610 configured to receive a second random access message from the base station in response to the first random access message, wherein the second random access message comprises a RAR, and wherein the RAR indicates a narrowband to be used for receiving a fourth random access message from the base station following the RAR. The apparatus includes a determination component 612 configured to determine whether to perform a measurement of the narrowband indicated in the second random access message. The determination component 612 may determine whether to perform the measurement of the narrowband indicated in the second random access message based on an amount of time between receiving the second random access message and transmitting the third random access message. For example, the determination component may determine to perform the measurement of the narrowband indicated in the second random access message when the amount of time between receiving the second random access message and transmitting the third random access message meets a threshold. The determination component may determine not to perform the measurement of the narrowband indicated in the second random access message when the amount of time between receiving the second random access message and transmitting the third random access message does not meet the threshold. The apparatus may include a threshold component 614 configured to receive an indication of the threshold from the base station. The apparatus includes a third random access message component 616 configured to transmit, to the base station, a third random access message. The apparatus may further include a fourth random access message component 622 configured to receive the fourth random access message from the base station, e.g., using the second narrowband.

The second random access message may be received on a first narrowband, and the narrowband for the fourth random access message may be received on a second narrowband. The apparatus may include a measurement component 618 configured to perform the measurement of the first narrowband and to perform measurement of the second narrowband according to the determination of the determination component 612. The apparatus may further include a report component 620 configured to report, in the third random access message, the measurement of the first narrowband or the second narrowband based on whether the apparatus determines to perform the measurement of the second narrowband that is indicated in the second random access message.

The narrowband indicated in the second random access message may be configured for hopping in a hopping set across different narrowbands. Thus, the measurement component 618 may be configured to perform the measurement of the different narrowbands. The report component 620 may be configured to report, in the third random access message, at least one of a highest quality measurement of one of the different narrowbands, a lowest quality measurement of one of the different narrowbands, an average measurement across the different narrowbands, the measurement of an earliest narrowband in the hopping set, or the measurement of a last narrowband in the hopping set.

The apparatus may include additional components that perform each of the blocks of the algorithm in the aforementioned flowcharts of FIGS. 4 and 5. As such, each block in the aforementioned flowcharts of FIGS. 4 and 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
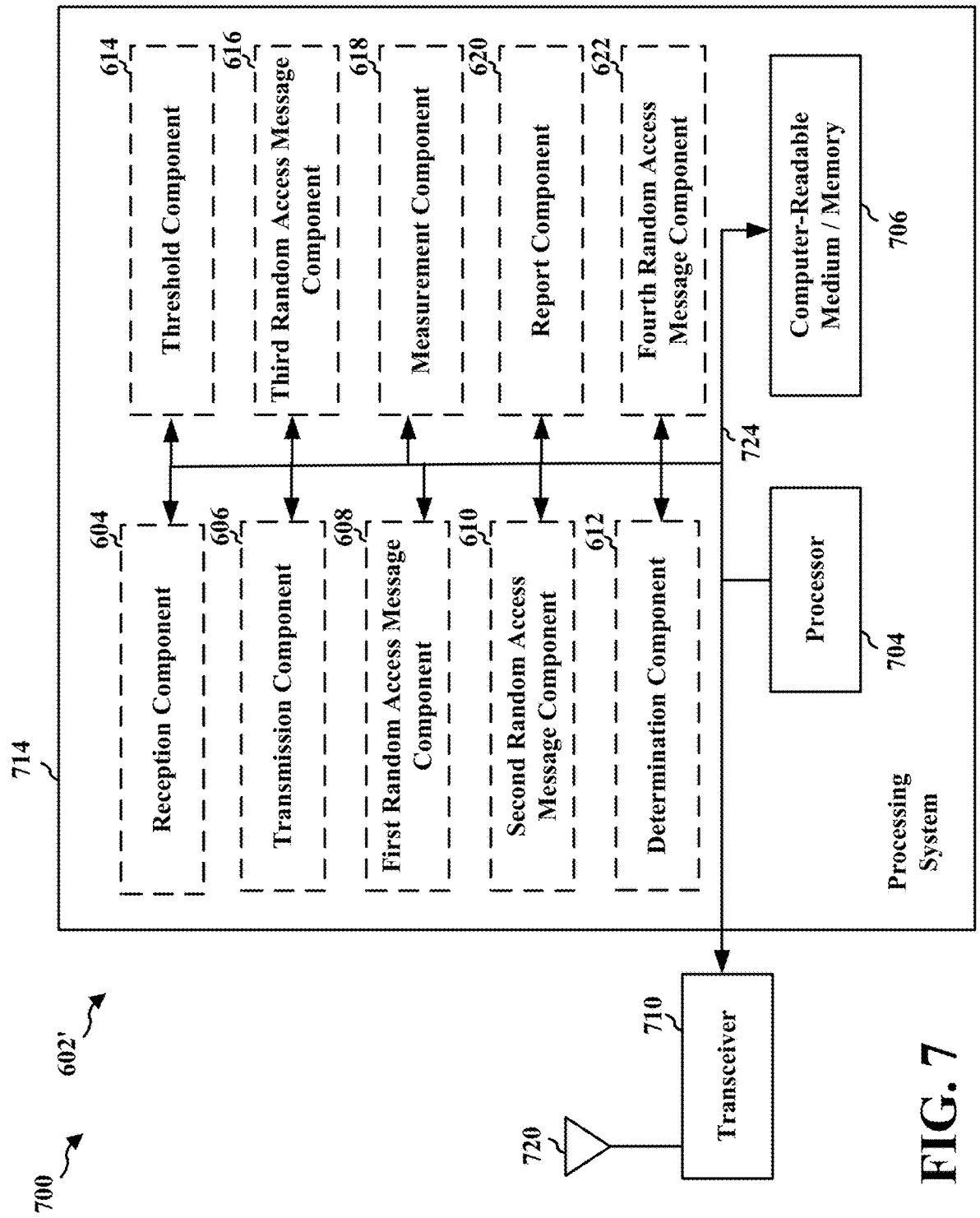
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, 616, 618, 620, 622, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 606, and based on the received information, generates a signal to be applied to the one or more antennas 720. The processing system 714 includes a processor 704 coupled to a computer-readable medium/ memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614, 616, 618, 620, 622. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication may include means for transmitting, to a base station, a first random access message comprising a preamble and means for receiving a second random access message from the base station in response to the first random access message. The second random access message may comprise a RAR that indicates a narrowband to be used for receiving a fourth random access message from the base station following the RAR. The apparatus may include means for determining whether to perform a measurement of the narrowband indicated in the second random access message and means for transmitting, to the base station, a third random access message. The means for determining may determine whether to perform the measurement of the narrowband indicated in the second random access message based on an amount of time between receiving the second random access message and transmitting the third random access message. For example, the means for determining may determine to perform the measurement of the narrowband indicated in the second random access message when the amount of time between receiving the second random access message and transmitting the third random access message meets a threshold. The means for determining may determine not to perform the measurement of the narrowband indicated in the second random access message when the amount of time between receiving the second random access message and transmitting the third random access message does not meet the threshold. The apparatus may include means for receiving an indication of the threshold from the base station. The second random access message may be received on a first narrowband, where the narrowband for the fourth random access message comprises a second narrowband.

The apparatus may include means for performing the measurement of the first narrowband and means for reporting, in the third random access message, the measurement of the first narrowband or the second narrowband based on whether the UE determines to perform the measurement of the second narrowband that is indicated in the second random access message. The narrowband indicated in the second random access message may be configured for hopping in a hopping set across different narrowbands, and the apparatus may include means for performing the measurement of the different narrowbands and means for reporting, in the third random access message at least one of a highest quality measurement of one of the different narrowbands, a lowest quality measurement of one of the different narrowbands, an average measurement across the different narrowbands, the measurement of an earliest narrowband in the hopping set, and/or the measurement of a last narrowband in the hopping set. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figures 8A, 8B:
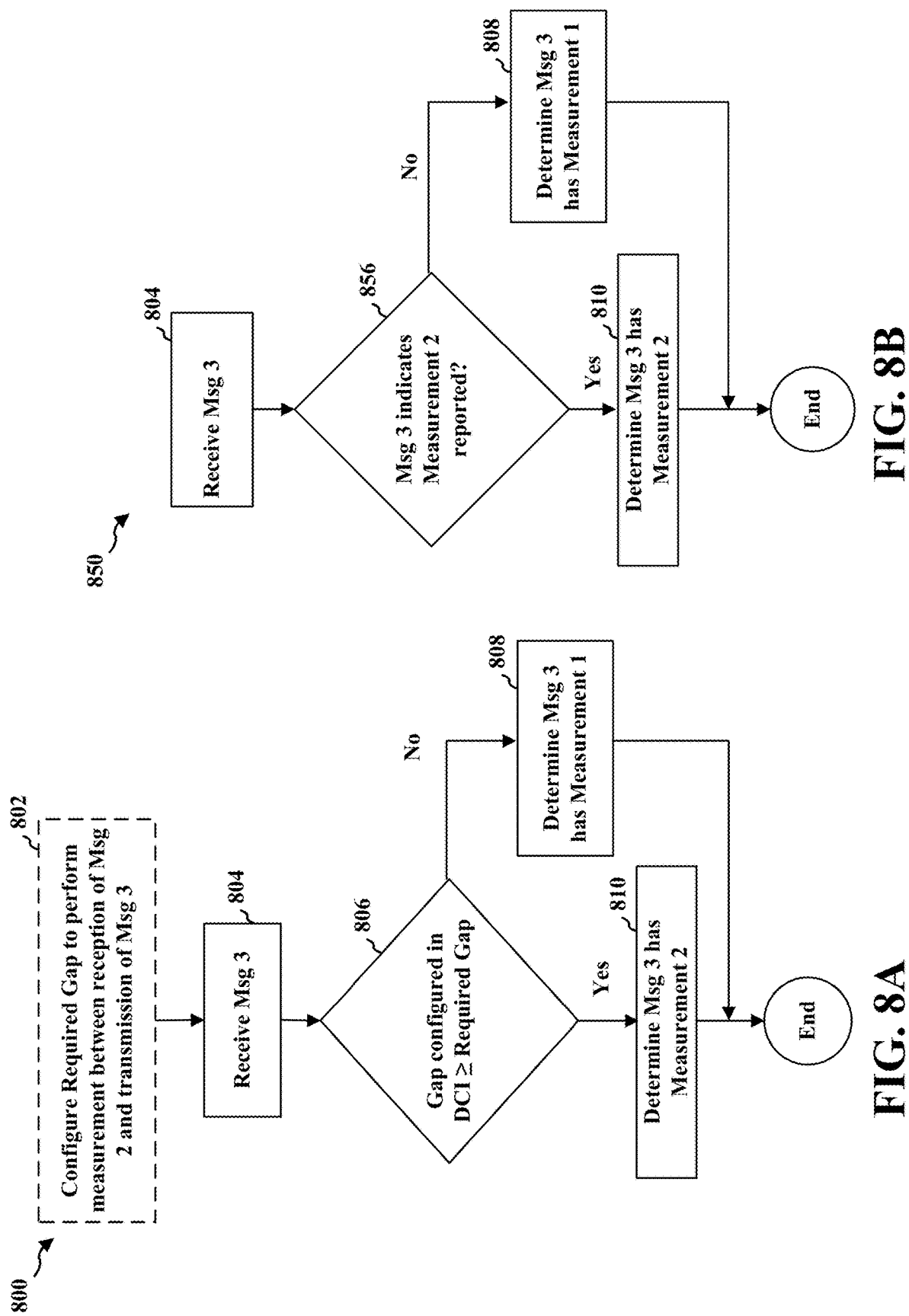
FIGS. 8A and 8B is a flowchart of a method of wireless communication.

FIGS. 8A and 8B illustrate methods of wireless communication that may be performed by a base station or a component of a base station (e.g., base station 102, 180, 310, 404, 650; the apparatus 1002, 1002'; the processing system 1114, which may include the memory 376 and which may be the entire base station 310 or a component of the base station 310, such as the TX processor 316, the RX processor 370, and/or the controller/processor 375). Optional aspects are illustrated with a dashed line. The base station may communicate with a UE based, e.g., on eMTC communication. FIG. 8A illustrates an example 800 in which the base station determines which measurement is reported in a random access Msg 3 from the UE based on a configured amount of time between random access Msg 2 and Msg 3. FIG. 8B illustrates an example 850 in which the base station determines which measurement is reported in the random access Msg 3 based on an indication from the UE. Aspects that are related for FIGS. 8A and 8B have been illustrated using a common reference number.

In both FIGS. 8A and 8B, the base station receives a random access Msg 3 from the UE, at 804. The reception may be performed, e.g., by the third random access message component 1016 of the apparatus 1002 in FIG. 10. The Msg 3 may be received in response to the base station transmitting an RAR, e.g., comprised in Msg 2, as described in connection with FIG. 4. The Msg 3 may comprise a report from the UE regarding measurements performed on a narrowband indicated by the base station. As described in connection with 405 and 413 in FIG. 4, the UE may perform measurements on a DCI narrowband that is used for Msg 2 (e.g., MPDCCH 1) and/or the UE may perform measurements on the DCI that is signaled in Msg 2 and that will be used for Msg 4 (e.g., MPDCCH 2). As the report may provide measurements for two different narrowbands, the methods of FIGS. 8A and 8B enable the base station to determine the narrowband to which the measurements reported by the UE pertain.

In FIG. 8A, the base determines whether the Msg 3 includes a measurement based on DCI for the narrowband of the Msg 2 (e.g., MPDCCH 1) or a measurement based on DCI for the narrowband that will be used for Msg 4 (e.g., MPDCCH 2) based on an amount of time between the transmission of Msg 2 to the UE and the reception of Msg 3 from the UE. The amount of time between Msg 2 and Msg 3 may be referred to as a gap in time. The base station may compare the time gap between Msg 2 and Msg 3 to a threshold amount of time, at 806. The comparison may be performed, e.g., by the determination component 1012 of the apparatus 1002 in FIG. 10. The threshold amount of time may be referred to as a required gap. The base station may configure the required gap for the UE to perform measurement on the narrowband that will be used for Msg 4 during the time between receiving DCI for Msg 2 from the base station and transmitting Msg 3 to the base station. Thus, the base station may signal the threshold, e.g. the required gap, to the UE at 802. The threshold may be configured or signaled, e.g., by the threshold component 1014 of the apparatus 1002 in FIG. 10. In other examples, the threshold amount of time, e.g., the required gap, may be have a predefined value that is known in advance by the base station and the UE. Thus, the UE may determine whether to report measurements for measurement 1 (based on MPDCCH 1) or measurement 2 (based on MPDCCH 2) based on the amount of time between Msg 2 and Msg 3 in comparison to a threshold, as described in connection with FIGS. 4 and 5. Likewise, the base station may determine whether the report in Msg 2 comprises measurement 1 (based on MPDCCH 1) or measurement 2 (based on MPDCCH 2) based on the amount of time between Msg 2 and Msg 3 in comparison to a threshold. The determinations as to which measurement is included in Msg 2 may be made independently by the UE and the base station, without explicit signaling to indicate which measurement is included in Msg 2. The determination may be performed, e.g., by the determination component 1012 of the apparatus 1002 in FIG. 10.

If the gap between Msg 2 and Msg 3 meets the threshold (e.g., gap≥required gap), the base station may determine, at 810, that the Msg 3 includes a measurement of the narrowband that will be used for Msg 4 (e.g., measurement 2 of MPDCCH 2). If the gap between Msg 2 and Msg 3 does not meet the threshold (e.g., gap<required gap), the base station may determine, at 808, that the Msg 3 includes a measurement of the narrowband used for Msg 2 (e.g., measurement 1 of MPDCCH 1).

The base station may also configure the gap between Msg 2 and Msg 3. Thus, the base station may indicate for the UE to measure the narrowband for Msg 4 through the selection of an amount of time between Msg 2 and Msg 3 that is equal to or greater than the required gap. The required gap may be agreed upon between the UE and the base station or known by the UE and the base station. For example, the required gap may be a predefined value that is known by both the UE and the base station. In another example, the required gap may be provided to the UE in a signaling message (e.g., broadcast information) from the base station.

In FIG. 8B, the base station uses an indication received from the UE to determine whether the report in Msg 2 comprises measurement 1 (based on MPDCCH 1) or measurement 2 (based on MPDCCH 2). For example, at 856, the base station may determine whether Msg 3 from the UE comprises an indication that a measurement of the narrowband for Msg 4 is reported. The determination may be performed, e.g., by the determination component 1012 of the apparatus 1002 in FIG. 10.

If the UE indicates that the narrowband for Msg 4 is reported, the base station may determine, at 810, that the Msg 3 includes a measurement of the narrowband that will be used for Msg 4 (e.g., measurement 2 of MPDCCH 2). If the UE indicates that the narrowband for Msg 4 is reported, the base station may determine, at 808, that the Msg 3 includes a measurement of the narrowband used for Msg 2 (e.g., measurement 1 of MPDCCH 1). Alternatively, the base station may determine whether the UE indicates that the measurement of the narrowband for Msg 2 is reported (e.g., measurement 1 of MPDCCH 1) rather than looking for an indication about measurement 2. If the UE indicates that measurement 1 is reported, the base station may determine that Msg 3 includes measurement 1. If UE does not indicate that measurement 1 is reported, the base station may determine that Msg 3 includes measurement 2.

Figure 9:
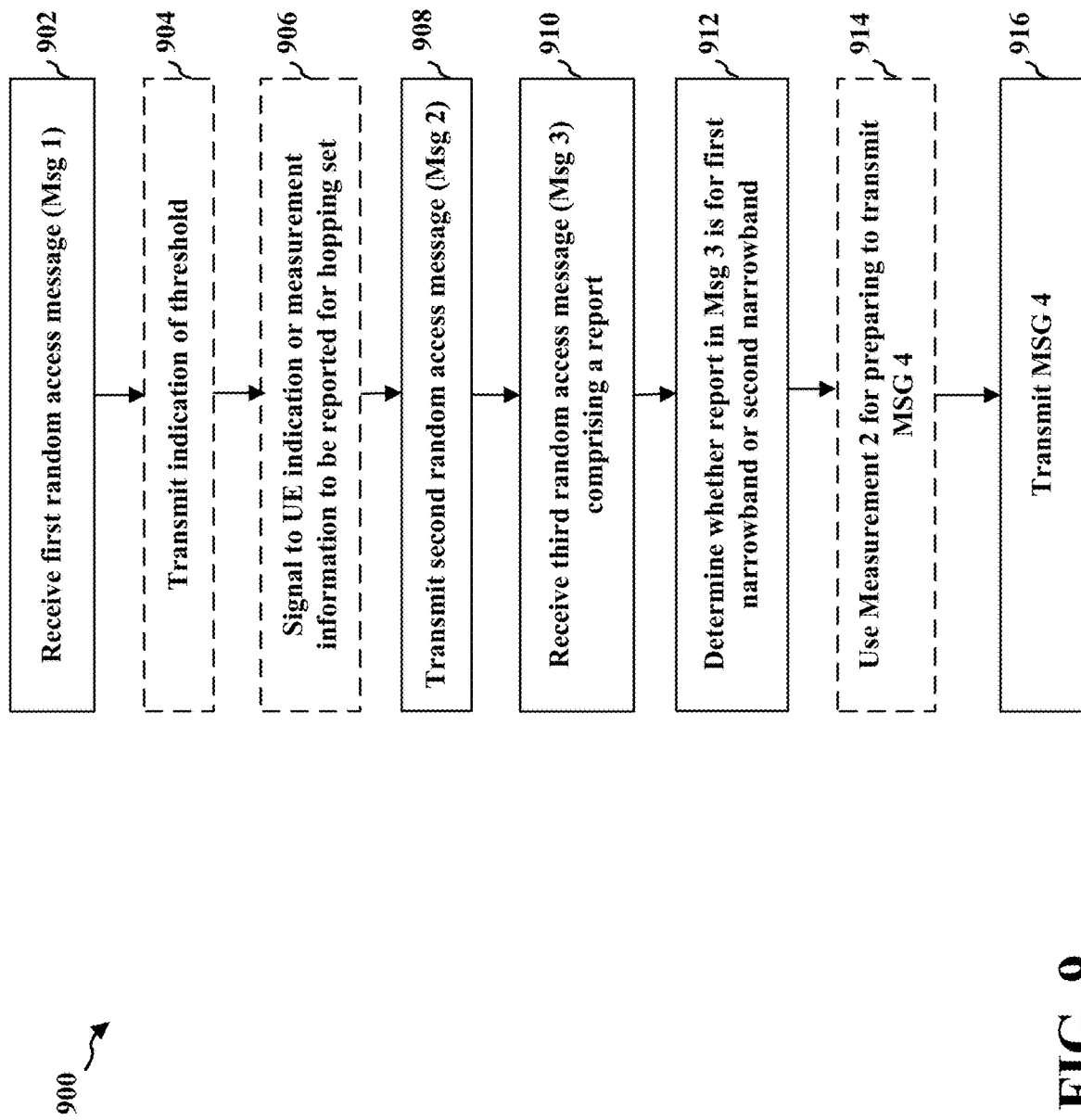
FIG. 9 is a flowchart of a method of wireless communication.

FIG. 9 is a flowchart 900 of a method of wireless communication. The method may be performed by a base station or a component of a base station (e.g., the base station 102, 180, 310, 404, 650; the apparatus 1002, 1002'; the processing system 1114, which may include the memory 376 and which may be the entire base station 310 or a component of the base station 310, such as the TX processor 316, the RX processor 370, and/or the controller/processor 375). The base station may communicate with the UE using eMTC. Optional aspects are illustrated with a dashed line. The method improves communication between a UE and a base station through the UE sending measurement of a narrowband in a report comprised in random access messaging. This early measurement performed as part of a random access procedure helps the base station to transmit communication to the UE, as early as Msg 4, based on the conditions of the narrowband experienced at the UE. The method further enables the base station to determine which narrowband has been measured and reported to the base station.

At 902, the base station receives, from a UE, a first random access message comprising a preamble. The reception may be performed, e.g., by the first random access message component 1008 and/or the reception component 1004 of the apparatus 1002 in FIG. 10. The first random access message may be referred to as Msg 1. FIG. 4 illustrates an example random access preamble at 403. As illustrated in FIG. 4, the preamble may be transmitted on a RACH.

At 908, the base station transmits, to the UE, a second random access message (e.g., Msg 2) using a first narrowband, wherein the second random access message comprises a RAR that indicates a second narrowband to be used by the UE for receiving a fourth random access message from the base station following the RAR. The transmission may be performed, e.g., by the second random access message component 1010 and/or the transmission component 1006 of the apparatus 1002 in FIG. 10. As illustrated in the example of FIG. 4, the RAR may be transmitted on PDSCH. DCI for the Msg 2 may be transmitted on MPDCCH 1, e.g., using the first narrowband.

At 910, the base station receives, from the UE, a third random access message comprising a report of a first measurement of the first narrowband or a second measurement of the second narrowband. The reception may be performed, e.g., by the third random access message component 1016 and/or the reception component 1004 of the apparatus 1002 in FIG. 10. The first measurement (e.g., of DCI for Msg 2 on MPDCCH 1) may be referred to as measurement 1, and the second measurement (e.g., of DCI for Msg 4 on MPDCCH 2) may be referred to as measurement 2.

At 912, the base station determines whether the report received in the third random access message comprises the first measurement of the first narrowband or the second measurement of the second narrowband. The determination may be performed, e.g., by the determination component 1012 of the apparatus 1002 in FIG. 10. The base station may determine whether the report received in the third random access message comprises the first measurement of the first narrowband or the second measurement of the second narrowband based on the amount of time between the second random access message and the third random access message, e.g., as described in connection with FIG. 8A. For example, the base station may determine that the report received in the third random access message comprises the second measurement of the second narrowband (e.g., measurement 2 for MPDCCH 2) when the amount of time between the second random access message and the third random access message meets a threshold, e.g., as in 810 in FIG. 8A. The base station may determine that the report received in the third random access message comprises the first measurement of the first narrowband (e.g., measurement 1 for MPDCCH 1) when the amount of time between the second random access message and the third random access message does not meet the threshold, e.g., such as at 808 in FIG. 8A. The threshold may comprise a predefined threshold that is known in advance by the base station and the UE. In another example, the base station may transmit, at 904, an indication of the threshold to the UE. Thus, the base station may configure the threshold gap. The threshold may be indicated, e.g., by the threshold component 1014 of the apparatus 1002 in FIG. 10.

The report in Msg 3 may comprise an indication that indicates whether the report comprises the first measurement of the first narrowband or the second measurement of the second narrowband. As described in connection with FIG. 8B, the base station may determine whether the report received in the third random access message comprises the first measurement of the first narrowband or the second measurement of the second narrowband based on the indication comprised in the report.

The second narrowband to be used by the UE for receiving the fourth random access message may be configured for hopping in a hopping set across different narrowbands. The report may comprise at least one of a highest measurement (e.g., a quality measurement and/or a signal power measurement, etc.) of one of the different narrowbands, a lowest measurement (e.g., a quality measurement and/or a signal power measurement, etc.) of one of the different narrowbands, an average measurement (e.g., a quality measurement and/or a signal power measurement) across the different narrowbands, a wideband measurement (e.g., a quality measurement and/or a signal power measurement, etc.) covering at least all of the narrowbands in the hopping set, the measurement (e.g., a quality measurement and/or a signal power measurement, etc.) of an initial narrowband in the hopping set, or the measurement (e.g., a quality measurement and/or a signal power measurement, etc.) of a last narrowband in the hopping set. At 906, the base station may signal, to the UE, an indication of measurement information to be reported for the hopping set. The indication may be signaled, e.g., by the report component 1020 of the apparatus 1002 in FIG. 10.

At 916, the base station transmits the fourth random access message using the second narrowband. The transmission may be performed, e.g., by the fourth random access message component 1018 and/or the transmission component 1006 of the apparatus 1002 in FIG. 10. The base station may use the measurement reported in the Msg 3 from the UE to transmit the fourth random access message, e.g., if the UE reported measurement 2 in Msg 3, e.g., as illustrated at 914.

Figure 10:
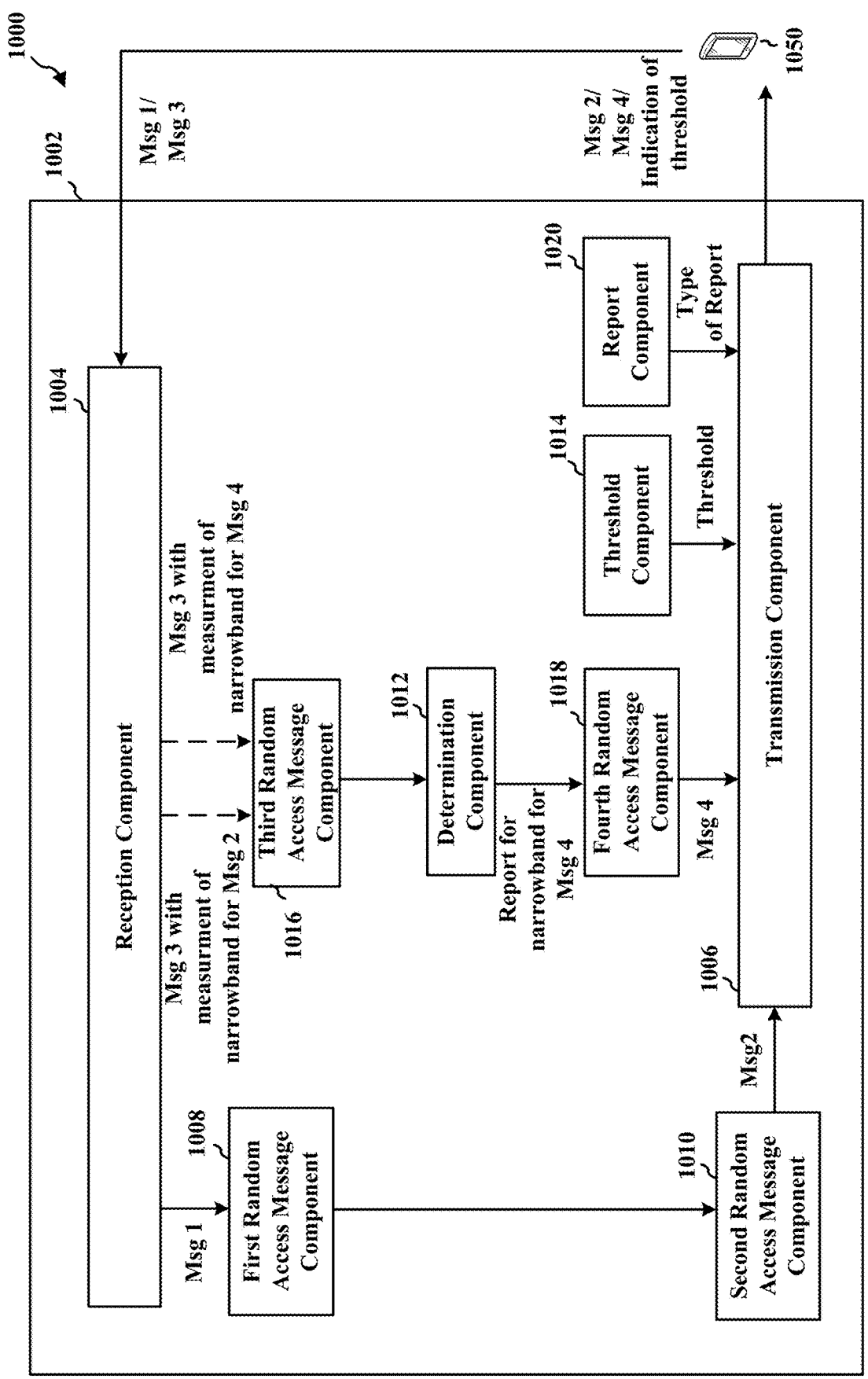
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a base station (e.g., base station 102, 180, 310, 404, 650). The apparatus includes a reception component 1004 configured to receive uplink communication from UE 1050 and a transmission component configured to transmit downlink communication to UE 1050. The apparatus includes a first random access message component 1008 configured to receive, from UE 1050, a first random access message comprising a preamble. The apparatus includes a second random access message component 1010 configured to transmit a second random access message to the UE 1050 in response to the first random access message, wherein the second random access message comprises a RAR, and wherein the RAR indicates a narrowband to be used for receiving a fourth random access message from the base station following the RAR. The apparatus includes a third random access message component 1016 configured to receive, from the UE, a third random access message comprising a report of a first measurement of the first narrowband or a second measurement of the second narrowband. The apparatus includes a determination component 1012 configured to determine whether the report received in the third random access message comprises the first measurement of the first narrowband or the second measurement of the second narrowband. The determination component 1012 may make the determination based on an amount of time between the second random access message and the third random access message. The determination component 1012 may determine whether the report received in the third random access message comprises the first measurement of the first narrowband or the second measurement of the second narrowband based on the amount of time between the second random access message and the third random access message. For example, the determination component 1012 may determine that the report received in the third random access message comprises the second measurement of the second narrowband when the amount of time between the second random access message and the third random access message meets a threshold, and that the report received in the third random access message comprises the first measurement of the first narrowband when the amount of time between the second random access message and the third random access message does not meet the threshold. The apparatus may include a threshold component 1014 configured to transmit an indication of the threshold from the base station. In another example, the report may comprise an indication that indicates whether the report comprises the first measurement of the first narrowband or the second measurement of the second narrowband, and the determination component 1012 may determine whether the report received in the third random access message comprises the first measurement of the first narrowband or the second measurement of the second narrowband based on the indication comprised in the report.

The apparatus includes a fourth random access message component 1018 configured to transmit the fourth random access message using the second narrowband.

The narrowband indicated in the second random access message may be configured for hopping in a hopping set across different narrowbands. The apparatus may include a report component 1020 may be configured to signal, to the UE, an indication of measurement information to be reported for the hopping set. For example the report component 1020 may indicate to the UE that the report should be based on, at least one of a highest quality measurement of one of the different narrowbands, a lowest quality measurement of one of the different narrowbands, an average measurement across the different narrowbands, the measurement of an earliest narrowband in the hopping set, or the measurement of a last narrowband in the hopping set.

The apparatus may include additional components that perform each of the blocks of the algorithm in the aforementioned flowcharts of FIGS. 4, 8A, 8B, and 9. As such, each block in the aforementioned flowcharts of FIGS. 4, 8A, 8B, and 9 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

Figure 11:
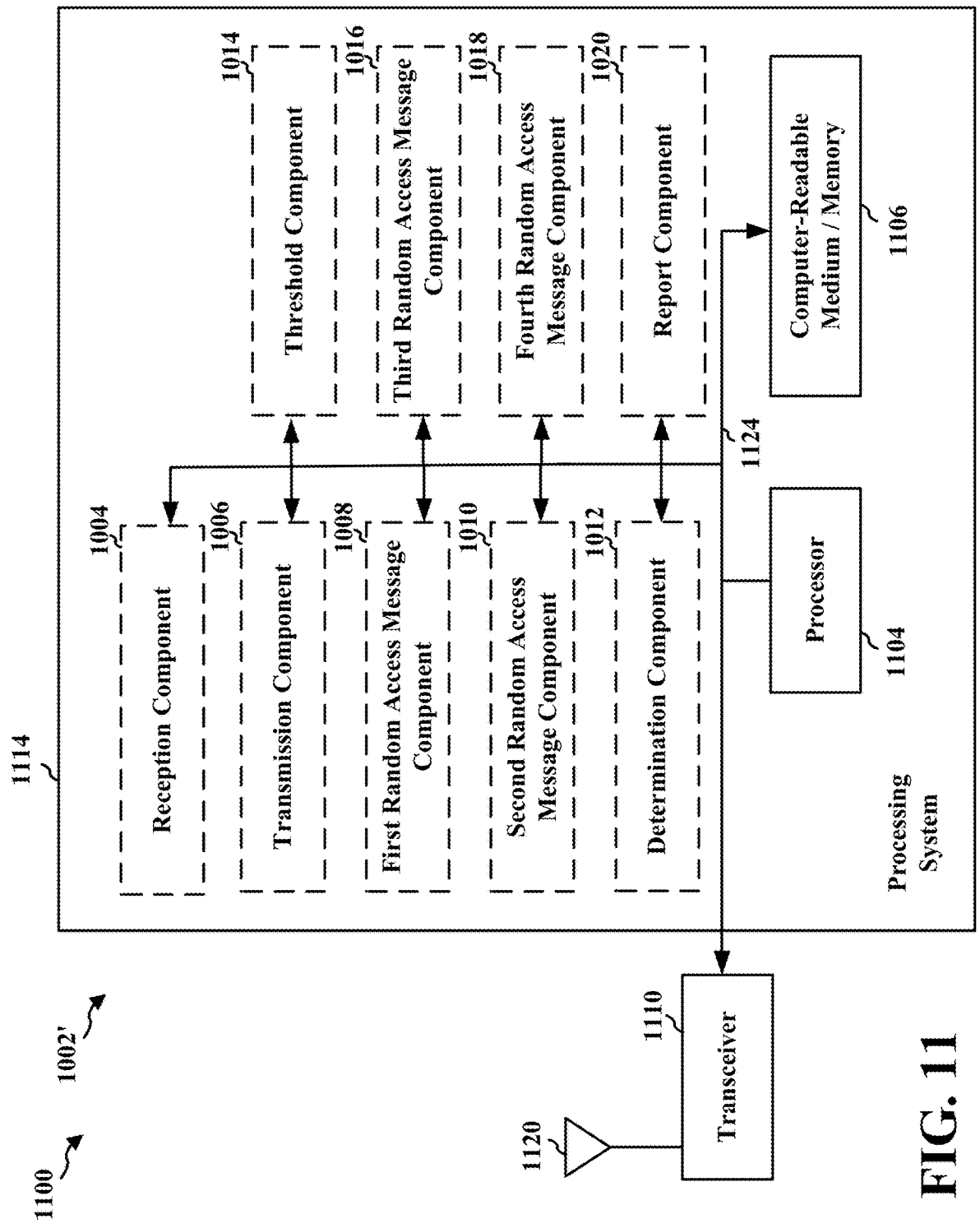
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020. The components may be software components running in the processor 1104, resident/stored in the computer readable medium/memory 1106, one or more hardware components coupled to the processor 1104, or some combination thereof.

The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for receiving, from a UE, a first random access message comprising a preamble and means for transmitting, to the UE, a second random access message using a first narrowband, wherein the second random access message comprises an RAR that indicates a second narrowband to be used by the UE for receiving a fourth random access message from the base station following the RAR. The apparatus may include means for receiving, from the UE, a third random access message comprising a report of a first measurement of the first narrowband or a second measurement of the second narrowband. The apparatus may include means for determining whether the report received in the third random access message comprises the first measurement of the first narrowband or the second measurement of the second narrowband based on an amount of time between the second random access message and the third random access message and means for transmitting the fourth random access message using the second narrowband. For example, the means for determining may determine whether the report received in the third random access message comprises the first measurment of the first narrowband or the second measurement of the second narrowband based on the amount of time between the second random access message and the third random access message. The means for determining may determine that the report received in the third random access message comprises the second measurement of the second narrowband when the amount of time between the second random access message and the third random access message meets a threshold, and that the report received in the third random access message comprises the first measurement of the first narrowband when the amount of time between the second random access message and the third random access message does not meet the threshold. The apparatus may include means for transmitting an indication of the threshold to the UE. The report may comprise an indication that indicates whether the report comprises the first measurement of the first narrowband or the second measurement of the second narrowband, and the means for determining may determine whether the report received in the third random access message comprises the first measurement of the first narrowband or the second measurement of the second narrowband based on the indication comprised in the report. The second narrowband to be used by the UE for receiving the fourth random access message may be configured for hopping in a hopping set across different narrowbands, and the apparatus may include means for signaling, to the UE, an indication of measurement information to be reported for the hopping set. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other examples or teaching described herein, without limitation.

Example 1 is a method of wireless communication at a UE, comprising: transmitting, to a base station, a first random access message comprising a preamble; receiving a second random access message from the base station in response to the first random access message, wherein the second random access message comprises a RAR, and wherein the RAR indicates a narrowband to be used for receiving a fourth random access message from the base station following the RAR; determining whether to perform a measurement of the narrowband indicated in the second random access message; and transmitting, to the base station, a third random access message, wherein the UE determines whether to perform the measurement of the narrowband indicated in the second random access message based on an amount of time between receiving the second random access message and transmitting the third random access message.

In Example 2, the method of Example 1 further includes that the UE determines to perform the measurement of the narrowband indicated in the second random access message when the amount of time between receiving the second random access message and transmitting the third random access message meets or exceeds a threshold.

In Example 3, the method of Example 1 or Example 2 further includes that the UE determines not to perform the measurement of the narrowband indicated in the second random access message when the amount of time between receiving the second random access message and transmitting the third random access message is below the threshold.

In Example 4, the method of any of Examples 1-3 further includes that the threshold comprises a predefined threshold.

In Example 5, the method of any of Examples 1-4 further includes receiving an indication of the threshold from the base station.

In Example 6, the method of any of Examples 1-5 further includes that the second random access message is received on a first narrowband, and wherein the narrowband for the fourth random access message comprises a second narrowband, the method further comprising: performing the measurement of the first narrowband; and reporting, in the third random access message, the measurement of the first narrowband or the second narrowband based on whether the UE determines to perform the measurement of the second narrowband that is indicated in the second random access message.

In Example 7, the method of any of Examples 1-6 further includes that a report of the measurement indicates whether the measurement is of the first narrowband or the second narrowband.

In Example 8, the method of any of Examples 1-7 further includes that, wherein the UE reports the measurement of the second narrowband if the amount of time between receiving the second random access message and transmitting the third random access message meets or exceeds a threshold.

In Example 9, the method of any of Examples 1-8 further includes that the UE reports the measurement of the first narrowband if the amount of time between receiving the second random access message and transmitting the third random access message is below the threshold.

In Example 10, the method of any of Examples 1-9 further includes that the narrowband indicated in the second random access message is configured for hopping in a hopping set across different narrowbands, the method further comprising: performing the measurement of the different narrowbands; and reporting, in the third random access message, at least one of: a highest measurement of one of the different narrowbands, a lowest measurement of one of the different narrowbands, an average measurement across the different narrowbands, a wideband measurement, the measurement of an earliest narrowband in the hopping set, or the measurement of a last narrowband in the hopping set.

In Example 11, the method of any of Examples 1-10 further includes that the UE determines the measurement to report for the different narrowbands based on a predefined rule.

In Example 12, the method of any of Examples 1-11 further includes that the UE determines the measurement to report for the different narrowbands based on signaling from the base station.

Example 13 is a device including one or more processors and one or more memories in electronic communication with the one or more processors storing instructions executable by the one or more processors to cause the device to implement a method as in any of Examples 1-12.

Example 14 is a system or apparatus including means for implementing a method or realizing an apparatus as in any of Examples 1-12.

Example 15 is a non-transitory computer readable medium storing instructions executable by one or more processors to cause the one or more processors to implement a method as in any of Examples 1-12.

Example 16 is a method of wireless communication at a base station, comprising: receiving, from a UE, a first random access message comprising a preamble; transmitting, to the UE, a second random access message using a first narrowband, wherein the second random access message comprises a RAR, and wherein the RAR indicates a second narrowband to be used by the UE for receiving a fourth random access message from the base station following the RAR; receiving, from the UE, a third random access message comprising a report of a first measurement of the first narrowband or a second measurement of the second narrowband; determining whether the report received in the third random access message comprises the first measurement of the first narrowband or the second measurement of the second narrowband; and transmitting the fourth random access message using the second narrowband.

In Example 17, the method of Example 16 further includes that the base station determines whether the report received in the third random access message comprises the first measurement of the first narrowband or the second measurement of the second narrowband based on an amount of time between the second random access message and the third random access message.

In Example 18, the method of Example 16 or Example 17 further includes that the base station determines that the report received in the third random access message comprises the second measurement of the second narrowband when the amount of time between the second random access message and the third random access message meets or exceeds a threshold.

In Example 19, the method of any of Examples 16-18 further includes that the base station determines that the report received in the third random access message comprises the first measurement of the first narrowband when the amount of time between the second random access message and the third random access message is below the threshold.

In Example 20, the method of any of Examples 16-19 further includes that the threshold comprises a predefined threshold.

In Example 21, the method of any of Examples 16-20 further includes transmitting an indication of the threshold to the UE.

In Example 22, the method of any of Examples 16-21 further includes that the report comprises an indication that indicates whether the report comprises the first measurement of the first narrowband or the second measurement of the second narrowband, and wherein the base station determines whether the report received in the third random access message comprises the first measurement of the first narrowband or the second measurement of the second narrowband based on the indication comprised in the report.

In Example 23, the method of any of Examples 16-22 further includes that the second narrowband to be used by the UE for receiving the fourth random access message is configured for hopping in a hopping set across different narrowbands, and wherein the report comprises, at least one of: a highest measurement of one of the different narrowbands, a lowest measurement of one of the different narrowbands, an average measurement across the different narrowbands, a wideband measurement, a measurement of an initial narrowband in the hopping set, or the measurement of a last narrowband in the hopping set.

In Example 24, the method of any of Examples 16-23 further includes signaling, to the UE, an indication of measurement information to be reported for the hopping set.

Example 25 is a device including one or more processors and one or more memories in electronic communication with the one or more processors storing instructions executable by the one or more processors to cause the device to implement a method as in any of Examples 16-24.

Example 26 is a system or apparatus including means for implementing a method or realizing an apparatus as in any of Examples 16-24.

Example 27 is a non-transitory computer readable medium storing instructions executable by one or more processors to cause the one or more processors to implement a method as in any of Examples 16-24.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. The description "A or B" may correspond to A only, B only, or A and B. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    transmitting, to a base station, a first random access message comprising a preamble;
    receiving a second random access message from the base station in response to the first random access message, wherein the second random access message comprises a random access response (RAR), and wherein the RAR indicates a narrowband to be used for receiving a fourth random access message from the base station following the RAR;
    determining whether to perform a measurement of the narrowband indicated in the second random access message; and
    transmitting, to the base station, a third random access message,
    wherein the UE determines whether to perform the measurement of the narrowband indicated in the second random access message based on an amount of time between receiving the second random access message and transmitting the third random access message.

2. The method of claim 1, wherein the UE determines to perform the measurement of the narrowband indicated in the second random access message when the amount of time between receiving the second random access message and transmitting the third random access message meets or exceeds a threshold.

3. The method of claim 2, wherein the UE determines not to perform the measurement of the narrowband indicated in the second random access message when the amount of time between receiving the second random access message and transmitting the third random access message is below the threshold.

4. The method of claim 2, wherein the threshold comprises a predefined threshold.

5. The method of claim 2, further comprising:
    receiving an indication of the threshold from the base station.

6. The method of claim 1, wherein the second random access message is received on a first narrowband, and wherein the narrowband for the fourth random access message comprises a second narrowband, the method further comprising:
    performing the measurement of the first narrowband; and
    reporting, in the third random access message, the measurement of the first narrowband or the second narrowband based on whether the UE determines to perform the measurement of the second narrowband that is indicated in the second random access message.

7. The method of claim 6, wherein a report of the measurement indicates whether the measurement is of the first narrowband or the second narrowband.

8. The method of claim 6, wherein the UE reports the measurement of the second narrowband if the amount of time between receiving the second random access message and transmitting the third random access message meets or exceeds a threshold.

9. The method of claim 8, wherein the UE reports the measurement of the first narrowband if the amount of time between receiving the second random access message and transmitting the third random access message is below the threshold.

10. The method of claim 1, wherein the narrowband indicated in the second random access message is configured for hopping in a hopping set across different narrowbands, the method further comprising:
performing the measurement of the different narrowbands; and
reporting, in the third random access message, at least one of:
a highest measurement of one of the different narrowbands,
a lowest measurement of one of the different narrowbands,
an average measurement across the different narrowbands,
a wideband measurement,
the measurement of an earliest narrowband in the hopping set, or
the measurement of a last narrowband in the hopping set.

11. The method of claim 10, wherein the UE determines the measurement to report for the different narrowbands based on a predefined rule.

12. The method of claim 10, wherein the UE determines the measurement to report for the different narrowbands based on signaling from the base station.

13. An apparatus for wireless communication at a User Equipment (UE), comprising:
a memory; and
at least one processor coupled to the memory and configured to:
transmit, to a base station, a first random access message comprising a preamble;
receive a second random access message from the base station in response to the first random access message, wherein the second random access message comprises a random access response (RAR), and wherein the RAR indicates a narrowband to be used for receiving a fourth random access message from the base station following the RAR;
determine whether to perform a measurement of the narrowband indicated in the second random access message; and
transmit, to the base station, a third random access message,
wherein the apparatus determines whether to perform the measurement of the narrowband indicated in the second random access message based on an amount of time between receiving the second random access message and transmitting the third random access message.

14. The apparatus of claim 13, wherein the apparatus determines to perform the measurement of the narrowband indicated in the second random access message when the amount of time between receiving the second random access message and transmitting the third random access message meets or exceeds a threshold.

15. The apparatus of claim 14, wherein the apparatus determines not to perform the measurement of the narrowband indicated in the second random access message when the amount of time between receiving the second random access message and transmitting the third random access message is below the threshold.

16. The apparatus of claim 14, wherein the at least one processor is further configured to:
receive an indication of the threshold from the base station.

17. The apparatus of claim 13, wherein the second random access message is received on a first narrowband, and wherein the narrowband for the fourth random access message comprises a second narrowband, wherein the at least one processor is further configured to:
perform the measurement of the first narrowband; and
report, in the third random access message, the measurement of the first narrowband or the second narrowband based on whether the apparatus determines to perform the measurement of the second narrowband that is indicated in the second random access message.

18. The apparatus of claim 13, wherein the narrowband indicated in the second random access message is configured for hopping in a hopping set across different narrowbands, wherein the at least one processor is further configured to:
perform the measurement of the different narrowbands; and
report, in the third random access message, at least one of:
a highest measurement of one of the different narrowbands,
a lowest measurement of one of the different narrowbands,
an average measurement across the different narrowbands,
the measurement of an earliest narrowband in the hopping set, or
the measurement of a last narrowband in the hopping set.

19. A method of wireless communication at a base station, comprising:
receiving, from a User Equipment (UE), a first random access message comprising a preamble;
transmitting, to the UE, a second random access message using a first narrowband, wherein the second random access message comprises a random access response (RAR), and wherein the RAR indicates a second narrowband to be used by the UE for receiving a fourth random access message from the base station following the RAR;
receiving, from the UE, a third random access message comprising a report of a first measurement of the first narrowband or a second measurement of the second narrowband;
determining whether the report received in the third random access message comprises the first measurement of the first narrowband or the second measurement of the second narrowband; and
transmitting the fourth random access message using the second narrowband.

20. The method of claim 19, wherein the base station determines whether the report received in the third random access message comprises the first measurement of the first narrowband or the second measurement of the second narrowband based on an amount of time between the second random access message and the third random access message.

21. The method of claim 20, wherein the base station determines that the report received in the third random access message comprises the second measurement of the second narrowband when the amount of time between the second random access message and the third random access message meets or exceeds a threshold.

22. The method of claim 21, wherein the base station determines that the report received in the third random access message comprises the first measurement of the first narrowband when the amount of time between the second random access message and the third random access message is below the threshold.

23. The method of claim 21, wherein the threshold comprises a predefined threshold.

24. The method of claim 21, further comprising:
transmitting an indication of the threshold to the UE.

25. The method of claim 19, wherein the report comprises an indication that indicates whether the report comprises the first measurement of the first narrowband or the second measurement of the second narrowband, and
wherein the base station determines whether the report received in the third random access message comprises the first measurement of the first narrowband or the second measurement of the second narrowband based on the indication comprised in the report.

26. The method of claim 19, wherein the second narrowband to be used by the UE for receiving the fourth random access message is configured for hopping in a hopping set across different narrowbands, and wherein the report comprises, at least one of:
a highest measurement of one of the different narrowbands,
a lowest measurement of one of the different narrowbands,
an average measurement across the different narrowbands,
a wideband measurement,
a measurement of an initial narrowband in the hopping set, or
the measurement of a last narrowband in the hopping set.

27. The method of claim 26, further comprising:
signaling, to the UE, an indication of measurement information to be reported for the hopping set.

28. An apparatus for wireless communication at a base station, comprising:
a memory; and
at least one processor coupled to the memory and configured to:
receive, from a User Equipment (UE), a first random access message comprising a preamble;
transmit, to the UE, a second random access message using a first narrowband, wherein the second random access message comprises a random access response (RAR), and wherein the RAR indicates a second narrowband to be used by the UE for receiving a fourth random access message from the base station following the RAR;
receive, from the UE, a third random access message comprising a report of a first measurement of the first narrowband or a second measurement of the second narrowband;
determine whether the report received in the third random access message comprises the first measurement of the first narrowband or the second measurement of the second narrowband; and
transmit the fourth random access message using the second narrowband.

29. The apparatus of claim 28, wherein the apparatus determines that the report received in the third random access message comprises the second measurement of the second narrowband when an amount of time between the second random access message and the third random access message meets or exceeds a threshold, and
wherein the apparatus determines that the report received in the third random access message comprises the first measurement of the first narrowband when the amount of time between the second random access message and the third random access message is below the threshold.

30. The apparatus of claim 28, wherein the report comprises an indication that indicates whether the report comprises the first measurement of the first narrowband or the second measurement of the second narrowband, and
wherein the apparatus determine whether the report received in the third random access message comprises the first measurement of the first narrowband or the second measurement of the second narrowband based on the indication comprised in the report.

* * * * *